(No Model.)

L. SEIVERT.
Wheel Harrow.

No. 233,442. Patented Oct. 19, 1880.

Witnesses:
J. B. Holderby
M. M. Lacey

Inventor
Lawrence Seivert
By R. S. & A. P. Lacey
Att'ys

UNITED STATES PATENT OFFICE.

LAWRENCE SEIVERT, OF BIG RIVER, WISCONSIN.

WHEEL-HARROW.

SPECIFICATION forming part of Letters Patent No. 233,442, dated October 19, 1880.

Application filed July 13, 1880. (No model.)

*To all whom it may concern:*

Be it known that I, LAWRENCE SEIVERT, a citizen of the United States, resident at Big River, in the county of Pierce and State of Wisconsin, have invented certain new and useful Improvements in Wheel-Harrows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in sulky-harrows, having for its object to secure a maximum amount of harrowing action upon the ground and to effect the ready adjustment of the parts with relation to the ground; and it consists of the mechanism for enabling the adjustment of the harrow-sections, as aforesaid, substantially as hereinafter more fully set forth.

Figure 1:
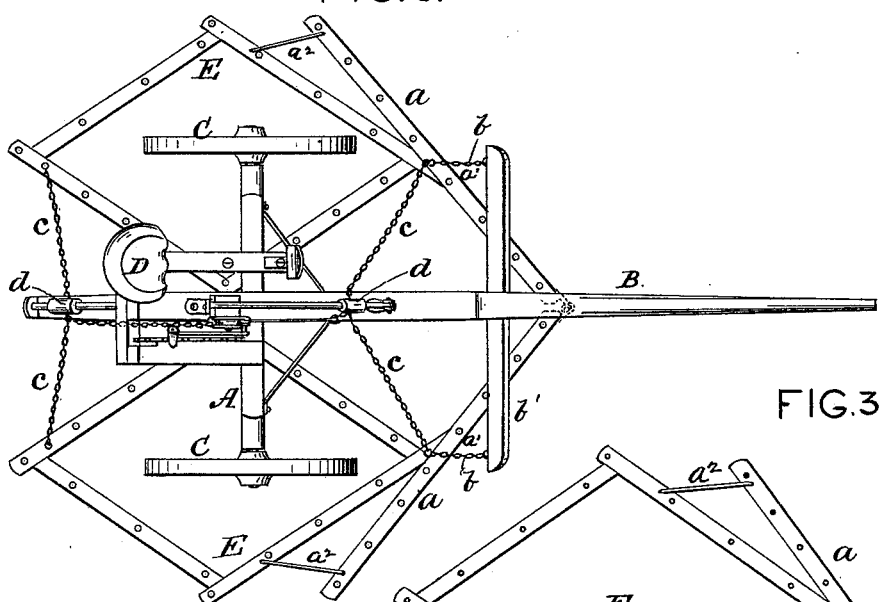
Figure 3:
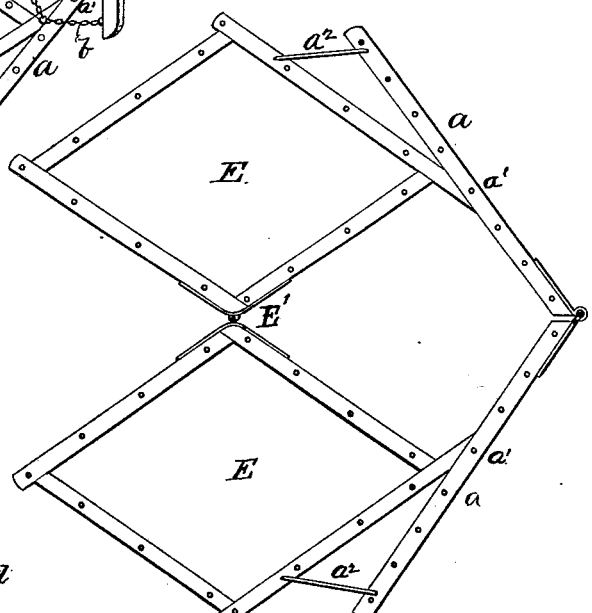
Figure 2:
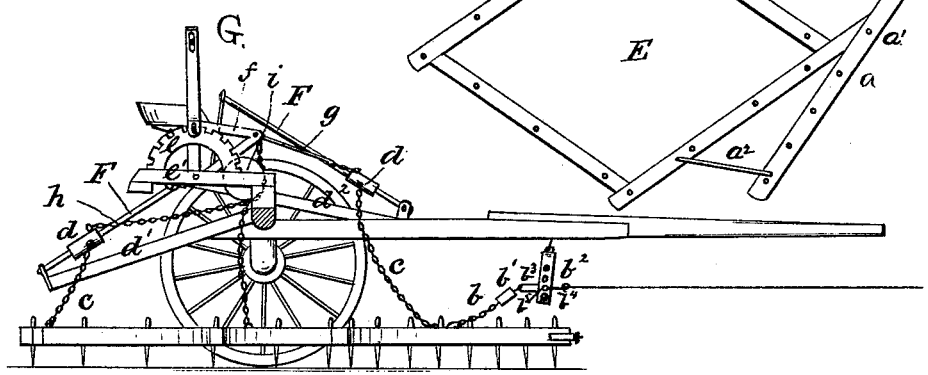

In the drawings, Figure 1 is a plan of the sulky and harrow. Fig. 2 is a plan of the harrow alone, and Fig. 3 is a side elevation of the sulky and harrow.

A indicates the axle, B the tongue, C the wheels, and D the driver's seat, of my sulky-harrow, all of ordinary construction.

E E are two harrow-sections, preferably of a diamond shape, with their adjacent apices hinged together, while at their front ends or apices are secured oblique harrow-bars $a$ $a$, suitably braced thereto, and with their forward ends hinged together about in the same horizontal plane and in line with the point of union between the harrow-sections. This arrangement of the sections and harrow-bars permits the location of the wheels within them, and thus allows the said sections to extend beyond on all sides of the wheels to secure a maximum harrowing action of the sections upon the ground. These sections and harrow-bars, it will be seen, are capable of being raised or lowered without interference with the wheels and tongue, they being hinged together and adapted to that end, as described. These sections, in addition to being chained, as at $b$, to tree $b'$, depending from a bar, $b^2$, connected to the tongue, are also connected by chains or other medium, $c$ $c$, both at the front end and at the rear end, to sleeves $d$ $d$, sliding upon inclined rods F, suitably secured in position upon a bar, $d'$, extending from the rear side of the axle and upon the tongue and a rearward-extending bar, $d^2$, thereof. Any other way of supporting the rods F may be adopted.

G is a hand-lever, with a detent engaging a segmental rack, $e$, secured to a frame, $e'$, mounted on the axle. This lever is provided, in the neighborhood of its pivotal point, with an arm, $f$, connected by a rod or chain, $g$, to the slide on the forward rod, F, and to the slide on the rear rod by a chain, $h$, passing over a pulley, $i$, disposed near the arm $f$ of the lever G. This arrangement serves to permit of the vertical adjustment of the harrow-sections with relation to the ground as occasion may require.

The harrow-sections E E may be hinged together at E', so that they can be readily detached, and by means of a rod can be separated several inches and held firmly in place. The bars $a$ $a$ will also be hinged or pivoted at $a'$ $a'$ and the brace-rods $a^2$ $a^2$ made removable, so that they can be replaced by longer rods. By this construction and arrangement the sections of the harrow may be disposed wider apart, so as to leave an untouched space of ground between them, when such is desired.

The draft-bar $b'$, being connected by the chains $b$ to the harrow-sections and by a link-coupling, $b^3$, to the pendent bar $b^2$, permits a free action of the said harrow-sections laterally, longitudinally, and vertically. The double-tree is hooked onto a clevis, $b^4$, on the front side of the pendent bar $b^2$. This arrangement of bar $b'$ and pendent bar $b^2$ not only permits the several movements of harrow hereinbefore described, but causes the harrow to run steadier and safer by preventing the jerking common to harrows of ordinary construction.

The clevis $b^4$ may be set higher or lower on the bar $b^2$, as is indicated by the series of holes $b^5$.

Having thus fully described my invention, I claim and desire to secure by Letters Patent—

1. In a wheel-harrow, the combination, with the sulky-frame, the operating-lever, and the lifting-chains c c and g h, of the inclined rods F F and the sliding couplings d d, placed on the rods F, and operating substantially as set forth.

2. In a wheel-harrow, the combination of the following elements: the sections E E, hinged together and suspended to the frame A B, so that they will swing forward and back, the chains b b, fixed to the apices of the harrow-sections and to the outer ends of the equalizing-bar b', and the pendent bar b², provided with a hitching attachment, and having its upper end pivoted to the under side of the tongue B, so that it swings freely longitudinally and laterally, and has its lower end coupled to the center of the equalizing-bar b', all arranged to operate substantially as set forth.

In testimony that I claim the foregoing I have hereunto set my hand and seal this 3d day of July, 1880.

LAWRENCE SEIVERT. [L. S.]

Witnesses:
AARON L. ROBERTS,
HENRY B. McCRAY.